United States Patent [19]
Johnson

[11] 3,879,368
[45] *Apr. 22, 1975

[54] CATALYST MODIFIED WITH CERTAIN STRONG REDUCING AGENTS AND SILANE COMPOUNDS AND USE IN POLYMERIZATION OF OLEFINS

[75] Inventor: Robert N. Johnson, Basking Ridge, N.J.

[73] Assignee: Union Carbide Corporation, New York, N.Y.

[ * ] Notice: The portion of the term of this patent subsequent to Aug. 29, 1989 has been disclaimed.

[22] Filed: June 25, 1973

[21] Appl. No.: 373,288

Related U.S. Application Data

[63] Continuation-in-part of Ser. No. 125,766, March 18, 1971, abandoned.

[52] U.S. Cl......... 260/94.9 C; 252/430; 252/431 R; 260/88.2 R; 260/93.7; 260/94.3; 260/94.9 DA
[51] Int. Cl......... C08f 1/42; C08f 3/06; B01j 11/84
[58] Field of Search........ 252/430, 431 R; 260/93.7, 260/88.2, 94.3, 94.9 DA

[56] References Cited
UNITED STATES PATENTS

| | | | |
|---|---|---|---|
| 3,324,095 | 6/1967 | Carrick et al. | 260/94.9 DA |
| 3,687,920 | 8/1972 | Johnson | 260/94.9 DA |
| 3,709,853 | 1/1973 | Karapinka | 260/94.9 DA |

Primary Examiner—Edward J. Smith
Attorney, Agent, or Firm—James J. O'Connell

[57] ABSTRACT

Strong reducing agents which are devoid of halogen atoms and certain silane compounds are used with supported bis(cyclopentadienyl)chromium [II] catalysts for the polymerization of olefins in order to obtain higher yields of polymer and allow for the use of supports which are activated at relatively low temperatures, and thus provide for a broader range of molecular weight distributions in the polymers made therewith.

49 Claims, 1 Drawing Figure

CATALYST MODIFIED WITH CERTAIN STRONG REDUCING AGENTS AND SILANE COMPOUNDS AND USE IN POLYMERIZATION OF OLEFINS

CROSS REFERENCE TO RELATED PATENT APPLICATIONS

This patent application is a continuation-in-part of patent application Ser. No. 125,766 filed Mar. 18, 1971, and now abandoned.

BACKGROUND OF THE INVENTION

1. Field of the Invention

This invention relates to the catalytic polymerization of olefin monomers.

2. Description of the Prior Art

U.S. Pat. No. 3,709,853 discloses the use of an inorganic oxide supported dis(cyclopentadienyl)chromium [II] compound as a catalyst for the polymerization of olefin monomers such as ethylene.

U.S. Pat. No. 3,687,920 discloses that the yield of the supported bis(cyclopentadienyl)chromium [II] catalysts can be substantially improved if the supported catalysts are modified with certain silane compounds.

When these silane modified supported catalysts systems are used under commercial operating conditions, however, it has been found that the best yields of polymer are only obtained when the support has been activated at a relatively high temperature. Polymers that are produced with such supports tend to have a relatively narrow molecular weight distribution. The need for the use of higher support activation temperatures thus increases the expense and technical difficulties involved in the use of such catalyst systems, and the relatively narrow range of molecular weight distribution of the resulting polymers limits their use to a relatively narrow range of commercial utility.

Although reducing agents have been used to modify some olefin catalysts for the purposes of modifying the molecular weight characteristics of the olefin polymers made therewith, they are not used to increase the yield of polymer when used with an otherwise active catalyst. Moreover, even when they do provide molecular weight modifications, each type of catalyst system provides a different type of response to the use of such reducing agents therewith, in the form of such modification in the molecular weight characteristics of the resulting polymers. Thus, when aluminum alkoxide reducing agents are used with Ziegler type catalysts, as noted in French Pat. No. 1,269,821, an increase in the molecular weight of the resulting polymers results. On the other hand, when the same aluminum alkoxide reducing agents are used with silyl chromate catalysts, as noted in U.S. Pat. No. 3,324,095, a decrease in the molecular weight of the resulting polymer results as evidenced by an increase in the melt index of the polymers. Further, when reducing agents are used with the supported dis(cyclopentadienyl)chromium[II] catalyst systems of U.S. Pat. No. 3,709,853, there is no appreciable change in the molecular weight of the resulting polymers.

SUMMARY OF THE INVENTION

It has now been found that the temperature used in activating supports which are to be used in the preparation of silane modified and supported bis(cyclopentadienyl)chromium[II] olefin polymerization catalysts can be substantially decreased without resulting in any appreciable decrease in the yield of polymer made therewith, and while also providing for the preparation of polymers made therewith having a relatively broad molecular weight distribution, if such silane modified catalyst is further modified with strong reducing agent which is devoid of halogen atoms.

An object of the present invention is to provide a supported dis(cyclopentadienyl)chromium[II] olefin polymerization catalyst system which can be prepared with a support which has been activated at a relatively low temperature and which will provide relatively high yields of polymer made therewith.

A further object of the present invention is to provide a supported bis(cyclopentadienyl)chromium[II] olefin polymerization catalyst system with which there can be produced, in high yields, olefin polymers having a relatively broad molecular weight distribution.

A further object of the present invention is to provide a means for improving the activity of a supported bis(cyclopentadienyl)chromium[II] catalyst system which has been prepared with a support which has been activated at a given activation temperature.

Another object of the present invention is to provide an improved olefin monomer polymerization process.

DESCRIPTION OF THE PREFERRED EMBODIMENT

It has now been found that the objects of the present invention may be achieved if a silane modified and supported bis(cyclopentadienyl)chromium[II] catalyst system is further modified with strong reducing agent which is devoid of halogen atoms.

STRONG REDUCING AGENT

The reducing agents which used to modify the silane modified and supported bis(cyclopentadienyl)chromium[II] catalyst systems for the purposes of the present invention are strong reducing agents, that is, they are characterized by the fact that they will react vigorously with water under the polymerization conditions to yield hydrogen, or a hydrocarbon. They are also devoid of halogen atoms.

The preferred reducing agents are:

a. the metals of Groups IA and IIA of the Mendeleef Periodic Table which have an atomic weight of <200, such as sodium, potassium, rubidium, cesium, beryllium, magnesium, calcium, strontium and barium, b. inorganic and organic compounds of such Group IA and IIA metals, and c. inorganic and organic compounds of boron, and bismuth and metals of Groups IIB, IIIA, IIIB, IVA and VA of such Periodic Table which have an atomic weight of <200.

Such (c) metals having an atomic weight of <200 would include zinc, cadmium, aluminum, gallium, indium, scandium, yttrium, lanthanum, germanium, tin, and antimony.

The reducing agents that may be used include inorganic compounds, i.e., hydrides of the alkaline earth metals, such as $BeH_2$, $MgH_2$, $CaH_2$, $SrH_2$ and $BaH_2$; alkali metal aluminum hydrides, such as $Li\,Al\,H_4$, $NaAlH_4$, $K\,AlH_4$, $RbAlH_4$ and $CsAlH_4$; borohydrides of the alkali metals and other metals, such as LiBH$_4$, NaBH$_4$, KBH$_4$, RbBH$_4$, CsBH$_4$, Mg(BH$_4$)$_2$, Be(BH$_4$)$_2$ and Al(BH$_4$)$_3$; and alkali metal hydrides such as NaH, KH and LiH.

The strong reducing agents that may be used also include organometallic compounds such as trialkyl aluminum compounds, alkyl aluminum hydride compounds, aluminum alkoxide compounds and other organometallic compounds.

The trialkyl aluminum compounds and the alkyl aluminum hydride compounds have some structural similarities. In these compounds the alkyl group is a hydrocarbyl group which can contain from 1 to about 14 carbon atoms. Illustrative of such compounds are trimethylaluminum, triethylaluminum, diethylaluminum, triisobutyl aluminum, tridecylaluminum, and tridodecylaluminum. They can be generically classed as compounds of the formula:

$$R''_y AlH_z$$

wherein R'' is an alkyl group as defined above, $y$ is an integer from 1 to 3 inclusive and $z$ is an integer from 0 to 2 inclusive, with the proviso that the sum of $y$ and $z$ is 3. Where these compounds contain more than one R'' group, such groups may be the same or different.

The aluminum alkoxide compounds have the general formula:

$$R'''_x Al(OR''')_w$$

in which $x$ and $w$ are each integers from 1 to 2, inclusive, and together total 3, and R''' is a hydrocarbyl group containing from 1 to about 14 carbon atoms such as alkyl, aralkyl, aryl, alkaryl, alicyclic, bicyclic and similar hydrocarbons. Examples of such groups are methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups. The aluminum monoalkoxides are the preferred reducing agents of this group of compounds. The R''' groups can be the same or different in these compounds.

Other organometallic, strong reducing agents that may be used would be those having the formula Me'R'', (Me')$_a$Me$-$(R'')$_b$ or (R''$-$)$_c$Me-Me$-$(R'')$_c$ where R'' is a monovalent C$_1$ to C$_{14}$ hydrocarbon group, Me' is monovalent, and Me is a polyvalent, metal or metalloid such as B, Zn, Mg, Li, Na, K, Ca, Ga, In, Cd, Sc, Y, La, Ge, Sn, Sb and Bi; $a$ is 0 or 1 and $b$ is an integer such that a+b equals the valence of Me; and $c$ is an integer which is 1 less than the valence of Me. Where a reducing agent compound contains two polyvalent metals or more than one R'' radical, such metals or R'' radicals may be the same or different. Compounds of this type would include borane compounds such as trimethylborane, triethylborane, triisobutylborane, and tri-n-butylborane; and metal alkyl or aryl compounds such as zinc diethyl, zinc diisopropyl, butyl lithium, diethyl magnesium, triethyl bismuth, dicyclopentadienyl tin [II], trimethyl antimony, pentamethyl antimony, lithium antimony hexaphenyl, and bis[(dimethyl) antimony].

The strong reducing agents may be used individually or in combination with each other.

SILANE COMPOUNDS

The silane compounds which are used with the supported bis(cyclopentadienyl)chromium[II] catalysts of the present invention have the structure:

$$H_3Si + SiH_2 +_m H \text{ or } R_{4-n}SiH_n$$

wherein $m$ is an integer from 0 to 3 inclusive, $n$ is an integer from 0 to 3 inclusive and R is a saturated or unsaturated hydrocarbon group containing from 1 to about 10, inclusive, carbon atoms, for instance, an alkyl, alkenyl, aryl, aralkyl, cycloalkyl or alkaryl group, such as methyl, ethyl, n-propyl, iso-propyl, n-butyl, heptyl, hexyl, cycloheptyl, cyclohexyl, allyl, propenyl, phenyl, naphthyl and benzyl. These compounds include silane, SiH$_4$, the unsubstituted dimer, trimer and tetramer of silane, and substituted derivatives of silane. Specific examples of these derivatives are diphenyl silane, triphenyl silane, di-1-napthyl silane, phenylsilane, ethyl silane, diethyl silane, triethyl silane, methyl diethyl silane, triisopropyl silane, tri(n-propyl) silane, diphenylmethyl silane, dibenzylsilane, triallyl silane, tri(n-hexyl) silane, tribenzyl silane, trimethyl silane and tributyl silane. Especially preferred because of their superior performance are the compounds $R_{4-n}SiH_n$ where each R is an aliphatic hydrocarbon group having 1 to 6, inclusive, carbon atoms. The silane may contain different R groups.

Inorganic Oxide Supported Bis(cyclopentadienyl)chromium[II]

The catalysts species comprises an organometallic biscyclopentadienyl chromium[II] compound deposited on an inorganic oxide support.

About 0.001 to 10%, or more, by weight of the organometallic compound is used on the support, based on the combined weight of the organometallic compound and the inorganic oxide support. The support is loaded, as much as possible, with the organometallic compound. The amount of the organometallic compound which can be deposited on the support varies, depending on the particular support being used, and the activation temperature of such support.

The bis(cyclopentadienyl)chromium[II]compound has the structure:

wherein R' and R'' may be the same or different C$_1$ to C$_{20}$, inclusive, hydrocarbon radicals, and $n'$ and $n''$ may be the same or different integers of 0 to 5, inclusive. The R' and R'' hydrocarbon radicals may be saturated or unsaturated, they may include aliphatic, alicyclic and aromatic radicals such as methyl, ethyl, propyl, butyl, pentyl, cyclopentyl, cyclohexyl, allyl, phenyl and naphthyl radicals.

The bis(cyclopentadienyl)chromium[II] compounds which may be used as catalysts on the inorganic oxide supports in accordance with the present invention may be prepared as disclosed in U.S. Pat. Nos. 2,870,183 and 3,071,605.

The inorganic oxide materials which may be used as a support for the organometallic compounds are materials having a high surface area, that is, a surface area in the range of about 50 to about 1000 square meters per gram. The inorganic oxides which may be used include silica, alumina, thoria, zirconia and other comparable inorganic oxides, as well as mixtures of such oxides.

Because bis(cyclopentadienyl)chromium[II] is sensitive to moisture, the catalyst support should be completely freed of physically absorbed water before it is brought into contact with the organochromium compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the physically absorbed water from the support while at the same time avoiding such heating as will remove all of the chemically bound water from the support. The passage of a stream of dry inert gas through the support during the drying aids in the displacement of the water from the support. Drying temperatures of from about 150°C. to 1000°C. for a short period of about 6 hours or so should be sufficient if a well dried inert gas s used, and the temperature is not permitted to get so high as to completely remove the chemically bound hydroxyl groups on the surface of the support.

Any grade of support can be used but microspheroidal intermediate density (MSID) silica having a surface area of 350 square meters per gram and a pore diameter of about 200 A, (W. R. Grace's G-952 grade), and intermediate density (ID) silica having a surface area of 285 $m^2$/gr and a pore diameter of 164 A (W. R. Grace's G-56 grade) are preferred. Other grades such as the G-968 silica and G-966 silica-alumina, as designated by W. R. Grace and Co., having surface areas of 700 and 500 square meters per gram, respectively, and pore diameters of 50–70 A are also quite satisfactory. Variations in melt index control and in polymer productivity can be expected between different grades of supports.

The supported catalysts can be prepared by a slurry technique where the selected and properly dried support is added under conditions which exclude the presence of air and moisture to a solution containing the bis(cyclopentadienyl)chromium[II] and solvent to form a slurry. The slurry may be stirred for a period of up to about 4 hours to obtain good absorption of bis(cyclopentadienyl)chromium[II] on the support. The solvent is then drained from the slurry and the catalyst used as such or the retained solvent can be evaporated under conditions which exclude oxygen and moisture to yield a dry, powdery supported catalyst.

The dry supported catalyst may also be conveniently prepared in the absence of solvent by direct vapor deposition (sublimation) of the selected bis(cyclopentadienyl)chromium[II] onto a dry support. This may be simply and conveniently accomplished by blending the bis(cyclopentadienyl)chromium[II] compound and support under a dry, inert atmosphere, and then reducing the pressure to cause the bis(cyclopentadienyl)chromium[II] to sublime and absorb onto the support.

COMPOSITE CATALYSTS

The composite catalysts of the present invention, as noted above, are prepared from the above described strong reducing agents and silane compounds and the above described inorganic oxide supported bis(cyclopentadienyl)chromium[II] compounds.

The composite catalyst comprises about 0.001 to 15.0 weight % of the strong reducing agent, about 0.2 to 84.799 weight % of the silane compound, and about 15 to 99.799 weight % of the inorganic oxide supported bis(cyclopentadienyl)chromium[II] compound, with the total weight % of the components of said composite catalyst amounting to 100. About 0.1 to 50 moles of the silane compound and about 0.001 to 10 moles of the strong reducing agent are used per mole of the organochromium compound.

Depending on the type of polymerization reaction being conducted, one or both of the strong reducing agent component and the silane compound component of the composite catalyst may be added to the inorganic oxide supported bis(cyclopentadienyl)chromium[II] component of the catalyst system prior to the polymerization reaction, or one or both of the reducing agent and silane components of the catalyst system may be separately added to the polymerization system with the inorganic oxide supported bis(cyclopentadienyl)-chromium[II] component. One or both of the strong reducing agents and the silane may also be added to the inorganic oxide support before, after, or concurrent with the addition of the organochromium compound thereto.

Where the strong reducing agent and the silane compound components are added to the inorganic oxide supported bis(cyclopentadienyl)chromium[II] compound, they may be deposited from a suitable solvent.

Suitable solvents which may be used as vehicles for the deposition of the strong reducing agent and/or silane compound on the inorganic oxide supported bis(cyclopentadienyl)chromium[II] compound include all the organic solvents listed below which may be used in the solution polymerization reactions. The solvent, of course, must be inert to the strong reducing agent and-/or silane compound to be dissolved therein.

Care should be taken to avoid having moisture, air or other catalyst poisons contact the composite catalyst.

The mechanism by which the strong reducing agent acts to improve the utility, as herein described, of the silane modified and inorganic oxide supported bis(cyclopentadienyl)chromium[II] catalyst is not precisely known. It is not known, for example, whether the strong reducing agent chemically reacts with one more of the other components of the catalyst system, or whether some other type of mechanism is involved.

About 0.00001 to 0.1 weight % of the composite catalyst is used per mol of monomer being polymerized. The amount of catalyst being employed may vary depending on the type of polymerization procedure being employed.

The Monomers

The monomers which are used in the monomeric charge being polymerized in accordance with the present invention may be one or more alpha-olefins containing 1 to about 8, inclusive, carbon atoms. The monomers may be mono-olefins or di-olefins.

The mono-olefins would include ethylene, propylene, butene-1, pentene-1, 3-methylbutene-1, hexene-1, 4-methylpentene-1, 3-ethyl-butene-1, heptene-1, octene-1, decene-1, 4,4-dimethylpentene-1, 4,4-diethylhexene-1, 3,4-dimethylhexene-1,4-butyl-1octene, 5-ethyl-1-decene, 3,3-dimethyl-butene-1, and the like. Among the diolefins which may be used are butadiene, 1,5-hexadiene, dicyclopentadiene, ethylidene norbornene, and the like.

The Polymers

The solid polymers which are prepared in accordance with the teachings of the present invention include homopolymers of ethylene which have densities of about 0.95 to 0.96, or more and copolymers of ethylene which have densities of about 0.94 or more. These polymers would also have melt indexes of about 0.01 or more, catalyst residue contents of ≤ than 1 part per million, calculated as chromium, and a molecular weight distribution characterized by a cyclohexene extractables content of greater than about 2%. These polymers are also essentially saturated materials as evidenced by an essential absence of absorbtion bands in the 10–13.25$\mu$ absorbtion region of the infrared absorbtion spectra of such polymers.

The preferred polymers are polymers of ethylene, homopolymers and interpolymers. The most preferred polymers are homopolymers of ethylene and copolymers containing at least 50% by weight of ethylene and up to 50% by weight of one or more other mono-and/or diolefins which may be interpolymerized therewith.

The Polymerization Reaction

After the composite catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30°C. or less up to about 200°C. or more, depending to a great extent on the operating pressure, the pressure of the entire monomer charge, the particular composite catalyst being used and its concentration. Naturally, the selected operating temperature is also dependent upon the desired polymer melt index since temperature is definitely a factor in adjusting the molecular weight of the polymer. Preferably, the temperature is from about 30°C. to about 100°C. in the conventional slurry or "particle forming" technique and from 100°C. to 200°C. in "solution forming." The control of temperature in this process is desirable as hereinafter more fully described in providing various effects upon molecular weight of the polymers as well as in controlling the phase in which they are made. As with most catalyst systems, higher polymerization temperatures produce lower weight average molecular weight polymers, and consequently of higher melt index. In fact, by operating at the higher polymerization temperatures, polymers of a melt index of 100 to 1000 or more are possible and can be characterized as waxes. Liquid polymers may also be prepared.

The pressure can be any pressure sufficient to initiate the polymerization of the monomer to the desired polymer and can be carried out from subatmospheric pressure, using an inert gas as a diluent, to superatmospheric pressure of up to about one million psig (pounds per square inch gauge), or more, but the preferred pressure is from atmospheric up to about 1000 psig. As a general rule, a pressure of 20 to 800 psig is preferred.

When an inert organic solvent medium is employed in this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, orthodichlorobenzene, and the like. Particularly preferred solvent media are cyclohexane, pentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature of the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90°C., whereas in pentane its solution temperature may be about 110°C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperatures, the monomer is more soluble in the solvent medium, thus counter-acting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than a fifty per cent solids content, provided sufficient fluidizing conditions and agitation are maintained. It is particularly preferable to operate the slurry process in the range of 30–40 weight per cent of polymer solids.

Recovery of the polymer from the solvent medium is, in this embodiment, reduced to a simple filtration and drying operation and no efforts need be expended in polymer clean up and catalyst separation or purification. The residual concentration of catalyst in the polymer is so small, that generally no more than about 1 part of chromium per million parts of polymer can be achieved, and at such levels they are innocuous and unnoticed in the polymer. Expeditiously, they can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25–30 per cent by weight of the polymer being produced. On the other hand, the temperature must be sufficiently low to avoid thermal destruction of the formed polymer and the particular catalyst employed. In general, for the various solvents and bis(cyclopentadienyl)chromium[II] catalyst used, temperatures within the range of about 100°C. to about 200°C. and preferably about 120°C. to about 170°C. have been found to be generally optimum for the practice of such solution polymerization procedure. However, the particular polymer being produced also has a significant effect on the optimum polymerization temperature. For example, ethylene-propylene copolymers which may be produced by this process may be soluble in many of these organic solvents at low temperatures and hence the use of such temperatures is permissible in this invention even though such temperatures may not be desired for optimum production of ethylene homopolymers.

Solvents constitute one of the ost significant and vexing sources of catalyst poisoning. Moreover, in most prior solution polymerization processes employing transition metal-containing catalysts, the use of large quantities of solvent, i.e., a solvent-to-polymer weight ratio of the order of 20:1, was believed necessary. Such large proportions of solvent, necessarily, greatly increased the catalyst poisoning problem. In the present process, however, the proportion by weight of solvent to polymer can be as low as 0:1:1 or even less, thereby maintaining a very high catalyst productivity and efficiency of the system.

When the solvent serves as the principal reaction medium, it is, of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

However, it is also possible to operate the polymerization reaction without an added solvent reaction medium, if desired. For example, a liquid monomer itself can be the reaction medium, as in making ethylene-propylene copolymers using commercially available liquefied propylene, or by operating under sufficient pressure that a normally gaseous monomer is liquefied.

The fact that the polymerization rate remains high even at the high viscosities encountered at high solids level, is unexpected. It is particularly surprising and unexpected that the reaction rate remains high when gaseous monomers such as ethylene are employed. We have found, however, that high polymerization rates are maintained even when using such gaseous monomers at pressures under 100 psig when the reaction solution is agitated by means of a high velocity, high shear stirrer, particularly one driven at speeds in excess of 2000 rpm and designed to impart considerable shearing action on the solution.

Another particularly important advantage afforded by this aspect of the process is that the high solids content polymer solution, upon completion of the polymerization reaction, is without any further treatment, suitable for polymer isolation, by milling techniques, such as those described in U.S. Pat. No. 2,434,707 to W. A. Marshall. The "Marshall mill" is operated most advantageously when the polymer-solvent mixture being treated is high in polymer content. The use of such an enclosed mill also permits the recycle of all or part of the separated solvent to the polymerization reactor without contact with oxygen or atmospheric water vapor which are destructive of many transition metal-containing catalysts.

Still another advantage of the present process is provided by maintainig the polymer, as formed, in a homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight since high reaction temperatures generally cause the formation of lower molecular weight polymer.

The separation of polymer from the solvent medium is not limited in this invention to the use of a high shear mill, although a Marshall mill has been found to be well suited for use herein and is preferred. However, it is also possible to employ precipitation and filtration techniques to recover the polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills such as the one described in U.S. Pat. No. 3,075,747 to W. L. Calvert, Banbury mills, and the like, can also be successfully employed to accomplish isolation of the polymer product. By the term "high shear mill" as used hereinafter is meant a mill comprising parallel rolls having intermeshing threads, and the term "high shear conditions" and "conditions of high shear" mean those conditions achieved on a high shear mill or by adequately powered high speed mixers for viscous materials.

It should be understood that the high solids system can be employed with the composite catalyst suspended in the solvent, provided that the necessary conditions of agitation, pressure, temperature, and the like are maintained so to provide contact of the monomer with the composite catalyst, and that the pressure and temperature are such as to initiate the polymerization of that monomer to the polymer.

By conducting the polymerization reaction is the presence of hydrogen, which appears to function as a chain transfer agent, the molecular weight of the polymer may be controlled.

Experience has shown that hydrogen may be used as a chain transfer agent in the polymerization reaction in amounts varying between about 0.001 to about 10 moles of hydrogen per mole of olefin monomer. For most polymerization reactions, lower molecular weight polymers may be obtained by using from about 0.001 to about 0.5 mole of hydrogen per mole of monomer.

Figure 1:
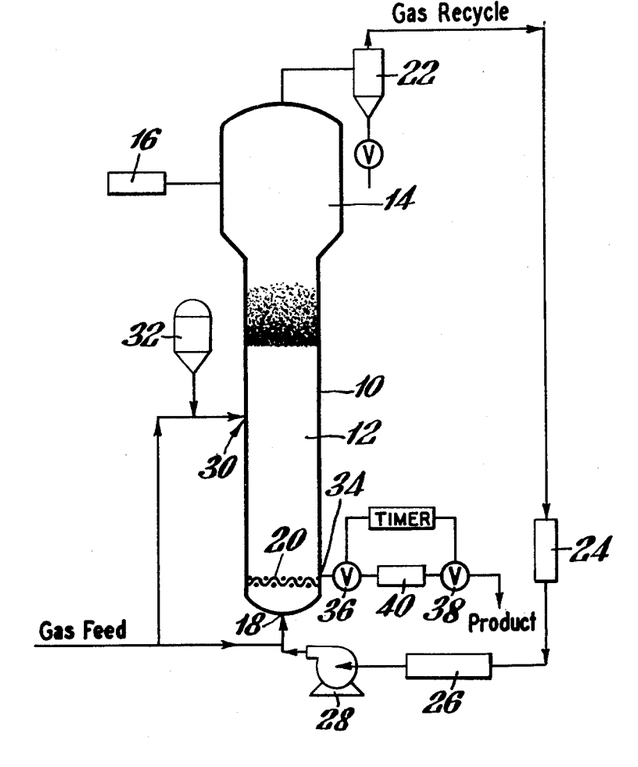
The drawing shows a fluid bed reaction system in which the catalyst composition of the present invention may be used.

The polymerization of alpha olefins such as ethylene with the catalysts of this invention in a fluid bed reactor can be readily appreciated by reference to the following description and attached Figure which illustrates the schematic operation of a fluidized bed reactor which may be used in the practice of this invention.

Employing the catalysts of this invention there may be produced, under conditions hereinafter set forth for a fluid bed reactor, ethylene homopolymers and polymers formed by polymerizing ethylene with α-olefins containing 3 to about 8 carbon atoms which are gaseous at the polymerization temperature and can be polymerized with ethylene at a temperature below the sintering temperature of the resultant polymer to form dry particulate resin particles essentially free of low molecular weight polymers such as waxes and greases.

Random copolymers as well as specialty polymers can also be produced in the fluid bed reactor. For instance, different monomers may be sequentially introduced to a single fluidized bed to form block copolymers. Another expedient is to transfer resin from a reactor containng one monomer through a suitable valve into a reactor containing another monomer with negligable carry over of monomer from one reactor to another. This latter expedient may also be effectively used to form mixtures of polymers. Both alternatives are particularly useful in forming block copolymers and mixtures of polymers from monomers having different reactivity properties.

The composite supported catalysts are used in the form of a concentrated slurry of particles or as powdery free flowing solid particles as hereinbefore described. The supported catalysts are preferably capable of subdivision, which is the ability of the catalyst particles to rupture in the presence of a growing polymer and thereby extend to form many particles having a low catalyst residue from a single catalyst particle.

The subdividable supported catalyst for the fluid bed reactor are preferably prepared, for instance, by depositing the strong reducing agent and silane modified bis-(cyclopentadienyl)chromium[II] on a porous carrier of high surface area. When incorporated in a porous support of high surface area, the catalyst forms active sites on the surface and in the pores of the support. Although the actual mechanism of the process is not entirely understood, it is believed that the polymers begin to grow at the surface as well as in the pores of the supported catalyst. When a pore grown polymer becomes large enough, it ruptures the support thereby exposing fresh catalyst sites in the inner pores of the support. The supported catalyst may thus subdivide many times during its lifetime in the bed and thereby enhance the production of low catalyst residue polymers, thereby eliminating the need for recovering the catalyst from the polymer particles. If the support is too large, it may resist rupture thereby preventing subdivision which would result in catalyst waste. In addition, a large support may act as a heat sink and cause "hot spots" to form.

A fluidized bed reaction system which may be used in the practice of this invention is illustrated in the FIG. With reference thereto the reactor 10 consists of a reaction zone 12 and a velocity reduction zone 14.

The reaction zone 12 comprises a bed of growing polymer particles, formed polymer particles and a minor amount of catalyst fluidized by the continuous flow of polymerizable and modifying gaseous components in the form of make-up feed and recycle gas through the reaction zone. To maintain a viable fluidized bed, mass gas flow through the bed must be above the minimum flow required for fluidization, preferably from about 2 to about 6 times $G_{mf}$ and more preferably from about 3 to about 5 $G_{mf}$. $G_{mf}$ is used in the accepted form as the abbreviation for the miximum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contain particles to prevent the formation of localized "hot spots" and to entrap and distribute the powdery catalyst throughout the reaction zone. On start up, the reaction zone is usually charged with a base of particulate polymer particles before gas flow is initiated. Such particles may be identical in nature to the polymer to be formed or different therefrom. When different, they are withdrawn when the desired formed polymer particles as the first product. Eventually, a fluidized bed of the desired particles supplants the start-up bed.

The catalyst concentration in the fluidized bed is substantially equal to the catalyst concentration in the product, namely in the order of about 0.005 to about 0.50 per cent of bed volume.

The catalyst used in the fluidized bed is preferably stored for service in a reservoir 32 under a nitrogen blanket.

Fluidization is achieved by a high rate of gas recycle to and through the bed, typically in the order of about 50 times the rate of feed of make-up gas. The fluidized bed has the general appearance of a dense mass of viable particles in possibly freevortex flow as created by the perculation of gas through the bed. The free flow of particles, and therefore fluidization, is substantiated by the fact that axial pressure drop through the bed is typically in the order of only about 1 psig.

Make-up gas is fed to the bed at a rate equal to the rate at which particulate polymer product is withdrawn. The composition of the make-up gas is determined by a gas analyzer 16 positioned above the bed. The gas analyzer determines component deficiency in the gas being recycled and the composition of the make-up is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surface and compressor blades.

The recycle gas is then passed through a heat exchanger 26 wherein it is stripped of heat of reaction before it is returned to the bed. By constantly removing heat of reaction, no noticeable temperature gradient appears to exist within the bed. In particular, it has been observed that the bed acts to almost immediately adjust the temperature of the recycle gas to make it conform to the temperature of the bed thereby maintaining itself at an essentially constant temperature under steady state conditions. The recycle is then compressed in a compressor 28 and returned to the reactor at its base 18 and to the fluidized bed through distribution plate 20.

The distribution plate 20 plays an important role in the operation of the reactor. The fluidized bed contains growing and formed particulate polymer particles as well as catalyst particles. As the polymer particles are hot and possibly active, they must be prevented from settling, for it a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. Whatever its design, it must diffuse the recycle gas through the particles at the base of the bed to keep them viable, and also serve to suport a quiescent bed of resin particles when the reactor is not in operation.

Hydrogen as a component of the gas stream is of equally significant utility in the vapor phase polymerization in the fluidized bed reactor as in more conventional systems. In vapor phase polymerization the melt index of the product is relatively insensitive to temperature in that a moderate change in operating temperature will not result in any significant change in melt index. Therefore, an alternate means to modify, where desired, melt index must be resorted to. It has been found that hydrogen influences the melt index of the polymer product. Generally, the melt index of the product increases as the hydrogen concentration in the gas stream is increased. Hydrogen may thus be used in the fluid bed polymerization reaction in amounts varying between about 0.001 to about 10 moles of hydrogen per mole of monomer. For most polymerization reactions, lower molecular weight polymer may be obtained by using from about 0.01 to about 0.5 mole of hydrogen per mole of monomer.

Also, if desired for temperature control of the system, any gas inert to the catalyst and reactants can be present.

It is essential to operate the fluid bed reactor at a temperature below the sintering temperature of the polymer particles. To insure that sintering will not occur, operating temperatures considerably below the sintering temperature are desired. For the production of ethylene homopolymers an operating temperature of from about 70' to about 110°C. is preferred, whereas an operating temperature of about 90°C. or lower is preferred for ethylene copolymers.

The fluid bed reactor is preferably operated at a pressure of from about 40 to 300 psi or more, with operation at the intermediate and elevated pressures favoring heat transfer since an increase in pressure increases the unit volume heat capacity of the gas.

The catalyst is injected into the bed at rate equal to its consumption at a point 30 which is above the distribution plate 20. Preferably, the catalyst is injected at a point located about ¼ to ¾ up the side of the bed. Injecting the catalyst at a point above the distribution plate is an important feature of this invention. Since the catalysts used in the practice of the invention are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots."

All or part of the make-up feed stream is used to carry the catalyst into the bed. It is preferred to use only part of the make-up feed stream as the carrier for the catalyst since at high productivities, the injection of a large amount of gas into the side of the bed may disrupt the characteristics of the bed and cause channeling or the like. As an alternative procedure, part of the recycle gas stream can be diverted for the purpose of carrying catalyst into the bed.

The productivity of the bed is solely determined by the rate of catalyst injection. The productivity of the bed may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a thermal analysis of the gas leaving the reactor is determinative of the rate of particulate polymer formation.

The particulate polymer product is preferably continuously withdrawn at a point 34 at or close to the dispersion plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to wait the next product recovery operation.

Finally, the fluidized bed reactor is equipped with an adequate venting system to allow venting the bed during start-up and shut down.

The supported catalyst system of this invention appears to yield a fluid bed product having an average particle size between about 40 and 100 mesh wherein catalyst and carrier residue is unusually low.

In operating the fluidized bed reactor several advantages have been observed when compared to current slurry and solution processes.

A major advantage is that there appears to be no tendency for the polymer to coat the walls of the fluid bed reactor. The formation of a coating of polymer on the walls of slurry and solution reactors is a relatively uncontrollable and an unpredictable phenomenon which hinders heat transfer and may cause clumps of polymer to "break-off" into the system.

On a productivity basis the fluidized bed reactor appears to offer reduced installation and operating costs.

It is also more stable in that it tends to naturally dampen any sudden change in operating conditions. There appears, therefore, to be more leeway in operating the fluidized bed reactor.

Finally, a most significant advantage is an improved ability to control gas composition. Gas composition in the slurry and solution reactors is limited by monomer solubility and diffusivity. Since there are no liquids in the fluidized bed reactor, the gas composition is essentially infinitely variable and useful gas compositions are governed only by the relative reactivities of the monomers present.

The following Examples are designed to illustrate the present invention and are not intended as a limitation upon the scope thereof.

The properties of the polymers produced in the Examples were determined by the following test methods:

| | |
|---|---|
| % cyclohexane extractables | extraction with boiling cyclohexane for 24 hours. |
| Tensile Impact | C. G. Bragaw; 12th S.P.E. Technical Conference, January 1956; page 240 of Preprints. |
| Density | ASTM D-1505- Plaque is conditioned for one hour at 120°C to approach equilibrium crystallinity. |
| Melt Index (MI) | ASTM D-1238- Measured at 190°C, reported as grams per 10 minutes. |
| Flow Rate (HLMI) | ASTM D-1238- Measured at 10 times the weight used in the melt index test above. |
| Flow Ratio (FRR) = Flow Rate/Melt Index | |
| Intrinsic viscosity (I.V.) | Measurement made on a solution of 0.15 grams of polymer in 100 cc. of decalin at 130°C. |
| Izod Impact | ASTM D-256-56 |

EXAMPLES 1–78

Various composite catalysts systems were prepared and evaluated in Examples 1 to 78 under slurry polymerization conditions as disclosed below. Various supports and silanes were used in such composite catalysts. The organo chromium compound used in such examples was bis(cyclopentadienyl)chromium[II], i.e., the compound in which $n$ and $n'$, as defined above, are each 0.

Unless otherwise indicated, each of the composite catalysts were prepared as follows: about 0.4 grams of the inorganic oxide support were activated by first heating the support in dry argon for 4 hours at 150°C. followed by an additional or second, heat treatment at the same or a higher temperature, as noted above, for at least 15–24 more hours. The thus activated support was first suspended in 100 ml of dry hexane under argon and was then treated with the strong reducing agent and/or the silane compound by adding a solution of either or both of such materials, dissolved in dry decane, to the suspended support. The reducing agent was used in this regard, in the form of a 0.5 molar solution and the silane was used in the form of a 0.1 molar solution. Where both the strong reducing agent and the silane were used to treat the support, they were added separately, the silane usually being added second. After the addition of the silane and/or the strong reducing agent, the resulting admixture was stirred for about 5 minutes at room temperature. The organo chromium compound was then added as a 0.05 molar solution in dry decane, and the resulting admixture was then added to a 1 liter autoclave reactor equipped with a stirrer. The reactor also contained about 500 ml of dry hexane solvent. The resulting mixture was then stirred for about 10 minutes at 55° to 70°C.

The reactor was sealed and the polymerization reaction was then conducted by admitting, under pressure, ethylene monomer, continuously so as to provide a total pressure of 200 psig. and, in some cases, about 10 to 50 psig. of hydrogen, batchwise, into the reactor at polymerization temperatures of about 85°–90°c. The reactions were all conducted for about 30 to 60 minutes. After the desired polymerization time, the ethylene feed was shut off and the reactor was cooled. The resulting polymer was then recovered by filtration followed by evaporation of solvent residue. Various physical tests were run on the polymer produced.

Tables I and V presented below disclose data relating to the evaluation of various strong reducing agents in Examples 1 to 78, in accordance with the present invention. The data relates to variations in the compositions of the various composite catalysts that were evaluated, the reaction conditions employed, and the yields and properties of the polymers that were obtained in the different experiments. Thus, the tables may disclose the amounts of each of the organochromium (BCPC) compound, the strong reducing agent and silane, in millimoles; the type and/or activation temperature (Supp. Act. Temp. °C.) of the inorganic oxide support; and the feed of hydrogen (in pounds per square inch gauge, psig) that was employed in each example; as well as the yield (in grams per hour of polymerization time); melt index (MI); flow ratio (FRR); intrinsic viscosity (I.V.);

% by weight of cyclohexane extractables (% Ext); tensile impact in foot pounds per cubic inch (Ten. Imp.); and/or Izod impact in foot pounds per inch of notch (Izod), of each of the polymers produced in such examples.

The silane compounds used in preparing the catalysts evaluated in Examples 1–29 were triethyl silane ($Et_3SiH$), methyl diethyl silane ($CH_3Et_2SiH$), diethyl silane ($Et_2SiH_2$), phenyl silane (phenyl $SiH_3$) and butyl silane (butyl $SiH_3$).

TABLE I

ETHYLENE POLYMERIZATION CATALYZED BY BIS CYCLOPENTADIENYL CHROMIUM II DEPOSITED ON GRADE 952 SILICA AND MODIFIED WITH VARIOUS SILANES AND TRIETHYL ALUMINUM

| EXAMPLE | BCPC MMOLES | SUPP. ACT. TEMP. °C. | TEA MMOLES | SILANE | SILANE MMOLES | YIELD GR.(HR. |
|---|---|---|---|---|---|---|
| 1 | 0.084 | 150 | 0 | None | 0 | Trace |
| 2 | 0.084 | 150 | 0.2 | None | 0 | Trace |
| 3 | 0.084 | 150 | 0 | $Et_3SiH$ | 0.93 | Trace |
| 4 | 0.084 | 150 | 0.2 | $Et_3SiH$ | 0.93 | 67 |
| 5 | 0.056 | 150 | 0 | $CH_3Et_2SiH$ | 0.63 | 11 |
| 6 | 0.056 | 150 | 0.2 | $CH_3Et_2SiH$ | 0.63 | 54 |
| 7 | 0.084 | 150 | 0 | $Et_2SiH_2$ | 0.94 | 60 |
| 8 | 0.084 | 150 | 0.2 | $Et_2SiH_2$ | 0.94 | 78 |
| 9 | 0.084 | 150 | 0 | Phenyl $SiH_3$ | 0.93 | 104 |
| 10 | 0.084 | 150 | 0.2 | Phenyl $SiH_3$ | 0.93 | 139 |
| 11 | 0.056 | 150 | 0 | Butyl $SiH_3$ | 0.62 | 80 |
| 12 | 0.056 | 150 | 0.2 | Butyl $SiH_3$ | 0.62 | 136 |
| 13 | 0.056 | 200 | 0 | None | 0 | Trace |
| 14 | 0.056 | 200 | 0.2 | None | 0 | 32 |
| 15 | 0.056 | 200 | 0 | Butyl $SiH_3$ | 0.22 | 100 |
| 16 | 0.056 | 200 | 0.2 | Butyl $SiH_3$ | 0.22 | 190 |
| 17 | 0.056 | 270 | 0 | None | 0 | Trace |
| 18 | 0.056 | 270 | 0.1 | None | 0 | 20 |
| 19 | 0.056 | 270 | 0 | Butyl $SiH_3$ | 0.19 | 218 |
| 20 | 0.056 | 270 | 0.1 | Butyl $SiH_3$ | 0.19 | 405 |
| 21 | 0.028 | 730 | 0 | None | — | 110 |
| 22 | 0.028 | 730 | 0.025 | None | — | 220 |
| 23 | 0.028 | 730 | 0 | $CH_3Et_2SiH$ | 0.01 | 180 |
| 24 | 0.028 | 730 | 0.025 | $CH_3Et_2SiH$ | 0.05 | 276 |
| 25 | 0.028 | 730 | 0 | Butyl $SiH_3$ | 0.03 | 224 |
| 26 | 0.028 | 730 | 0.025 | Butyl $SiH_3$ | 0.05 | 248 |
| 27 | 0.039 | 900 | 0 | None | — | 96 |
| 28 | 0.039 | 900 | 0 | $CH_3Et_2SiH$ | 0.08 | 180 |
| 29 | 0.039 | 900 | 0.05 | $CH_3Et_2SiH$ | 0.16 | 280 |

EXAMPLES 1–29

In Examples 1–29 the use of triethyl aluminum (TEA) was evaluated, under various conditions, as a strong reducing agent in accordance with the present invention. The inorganic oxide support used in preparing the composite catalysts used in Examples 1–29 was a microsperoidal intermediate density grade of silica having a surface area of about 350 square meters per gram and a pore diameter of about 200A. The supports used in these Examples were activated at various temperatures and the temperature at which the support was activated during the second step in the heat activation process, as described above, is listed in Table I below. Table I also lists other variations in the compositions of the various composite catalyst system that were employed in Examples 1–29, and also the yields of polymer that were obtained in such Examples.

EXAMPLES 30–54

In examples 30–54, triethyl aluminum (TEA) was evaluated under various conditions, as a strong reducing agent in accordance with the present invention, using a different inorganic oxide support than was used in Examples 1–29. The support used in Examples 30–54 was an intermediate density grade of silica having a surface area of about 285 square meters per gram and a pore diameter of about 164A. The supports used in Examples 30–54 were activated at various temperatures and the temperature at which the support was activated during the second step in the heat activation process, as described above, is listed in Table II below. Table II also lists other variations in the compositions of the various composite catalyst systems that were employed in Examples 30–54, and also the yields of polymer that were obtained in such Examples.

TABLE II

ETHYLENE POLYMERIZATION CATALYZED BY BIS CYCLOPENTADIENYL CHROMIUM II DEPOSITED ON GRADE 56 SILICA AND MODIFIED WITH VARIOUS SILANES AND TRIETHYL ALUMINUM

| EXAMPLE | BCPC MMOLES | SUPP. ACT. TEMP. °C. | TEA MMOLES | SILANE | SILANE MMOLES | YIELD GR./HR. |
|---|---|---|---|---|---|---|
| 30 | 0.084 | 190 | 0 | None | — | Trace |
| 31 | 0.084 | 190 | 0.1 | None | — | 20 |
| 32 | 0.084 | 190 | 0 | Butyl $SiH_3$ | 0.30 | 173 |
| 33 | 0.084 | 190 | 0.1 | Butyl $SiH_3$ | 0.30 | 198 |
| 34 | 0.056 | 390 | 0 | None | — | 20 |
| 35 | 0.056 | 390 | 0.05 | None | — | 90 |
| 36 | 0.039 | 390 | 0 | $Et_2SiH_2$ | 0.19 | 140 |
| 37 | 0.039 | 390 | 0.05 | $Et_2SiH_2$ | 0.19 | 330 |

TABLE II—Continued

ETHYLENE POLYMERIZATION CATALYZED BY BIS CYCLOPENTADIENYL CHROMIUM II DEPOSITED ON GRADE 56 SILICA AND MODIFIED WITH VARIOUS SILANES AND TRIETHYL ALUMINUM

| EXAMPLE | BCPC MMOLES | SUPP. ACT. TEMP. °C. | TEA MMOLES | SILANE | SILANE MMOLES | YIELD GR./HR. |
|---|---|---|---|---|---|---|
| 38 | 0.039 | 390 | 0 | $Et_3SiH$ | 0.11 | 110 |
| 39 | 0.039 | 390 | 0.05 | $Et_3SiH$ | 0.19 | 220 |
| 40 | 0.039 | 390 | 0 | $CH_3Et_2SiH$ | 0.44 | 120 |
| 41 | 0.039 | 390 | 0.05 | $CH_3Et_2SiH$ | 0.19 | 300 |
| 42 | 0.039 | 390 | 0 | Butyl $SiH_3$ | 0.19 | 180 |
| 43 | 0.039 | 390 | 0.10 | Butyl $SiH_3$ | 0.26 | 250 |
| 44 | 0.039 | 590 | 0 | None | — | 103 |
| 45 | 0.039 | 590 | 0.04 | None | — | 160 |
| 46 | 0.039 | 590 | 0 | $CH_3Et_2SiH$ | 0.08 | 190 |
| 47 | 0.039 | 590 | 0.05 | $CH_3Et_2SiH$ | 0.19 | 270 |
| 48 | 0.039 | 790 | 0 | None | — | 210 |
| 49 | 0.039 | 790 | 0.05 | None | — | 216 |
| 50 | 0.039 | 790 | 0 | $CH_3Et_2SiH$ | 0.08 | 220 |
| 51 | 0.039 | 790 | 0.05 | $CH_3Et_2SiH$ | 0.08 | 240 |
| 52 | 0.033 | 890 | 0 | None | 0 | 25 |
| 53 | 0.033 | 890 | 0.05 | None | — | 89 |
| 54 | 0.033 | 890 | 0.05 | $CH_3Et_2SiH$ | 0.10 | 191 |

EXAMPLES 55-61

In Examples 55-61 various strong reducing agents, i.e., butyl lithium, diethyl magnesium and diethyl aluminum ethoxide, were evaluated under various conditions in accordance with the present invention. The inorganic oxide support used in Examples 55-58 and 60-61 was the same as that used in Examples 1-29 and the support used in Example 59 was a silica-alumina (9-9.5-0.5% by weight) material having surface area and pore size characterized similar to the support used in Examples 1-29. Only one silane compound, butyl silane, was used in preparing the catalyst systems evaluated in Examples 55-61. The supports used in Examples 55-61 were activated at various temperatues, and the temperatures at which the supports were activated during the second step in the heat activation process, as described above, are listed in Table III below. Table III also lists other variations in the compositions of the various composite catalyst systems that were evaluated in Examples 55-61, and also the yields of polymer that were obtained in such examples.

temperatures, including relatively low activation temperatures. This data indicates, also, that comparable yields of polymer may be obtained with the catalyst systems of the present invention, as compared to the yields obtained using the catalyst systems of the above identified patent applications, even though the supports used in the catalyst systems of the present invention have been activated at temperatures which are substantially lower than those used in activating the supports used in such other catalyst systems.

EXAMPLES 62-74

In Examples 62-74 triethyl aluminum (TEA) was evaluated under various conditions, as a strong reducing agent in accordance with the present invention. The inorganic oxide support used in Examples 62-74 was the same as that employed in Examples 1-29. Methyl diethyl silane was used as the silane component in Examples 64, 66 and 73 and butyl silane was used as the silane component of the catalyst in all the other examples. The amounts of the organochromium compound,

TABLE III

BUTYL SILANE —REDUCING AGENT MODIFIED SUPPORTED CATALYST FOR ETHYLENE POLYMERIZATION

| EXAMPLE | BCPC MMOLES | SUPP. ACT. TEMP. °C. | REDUCING AGENT | MMOLES | BUTYL SILANE MMOLES | YIELD GR./HR. |
|---|---|---|---|---|---|---|
| 55 | 0.084 | 150 | None | — | None | <10 |
| 56 | 0.084 | 150 | None | — | 0.62 | 80 |
| 57 | 0.084 | 150 | Butyl Li | 0.13 | 0.30 | 147 |
| 58 | 0.084 | 150 | $Et_2Mg$ | 0.14 | 0.30 | 143 |
| 59 | 0.056 | 190 | TEA | 0.1 | 0.62 | 187 |
| 60 | 0.055 | 250 | None | — | 0.26 | 144 |
| 61 | 0.055 | 250 | $Et_2AlOEt$ | 0.05 | 2.26 | 198 |

The data shown in Tables I–III illustrates that the use of a catalyst system prepared in accordance with the present invention, i.e., with a strong reducing agent and a silane compound, generally provides for a substantial increase in yield of polymer produced therewith, as compared to the yields of polymer obtained with the use of catalyst made without either or both of the strong reducing agent and the silane compound. The data also indicates that the improved yields may also be obtained with the use of catalysts made with supports that have been activated over a wide range of activation strong reducing agent and silane used in each of the catalysts of Examples 62-74 are disclosed in Table IV below. The supports used in the catalysts of Examples 62-74 were activated at various temperatures, and the temperatures at which the supports were activated during the second step of the heat activation process, as described above, are listed in Table IV below. Various amounts of hydrogen pressure were used in the reactions, and these amounts are also listed in Table IV. Table IV further lists various physical properties of the polymers made in Examples 62-74.

TABLE IV

EFFECT OF SUPPORT ACTIVATION TEMPERATURE ON POLYMER PROPERTIES OF ETHYLENE HOMOPOLYMERS MADE WITH TEA-SILANE MODIFIED BIS CYCLOPENTADIENYL CHROMIUM II CATALYSTS

| EXAMPLE | BCPC MMOLES | TEA MMOLES | SILANE MMOLES | SUPP. ACT. TEMP. °C. | $H_2$ PSIG | M.I. | FRR | % EXT. | I.V. | TEN. IMP. | IZOD |
|---|---|---|---|---|---|---|---|---|---|---|---|
| 62 | 0.033 | 0.05 | 0.160 | 880 | 22 | 5.9 | 48 | 5.8 | 1.36 | 74 ± 16 | — |
| 63 | 0.033 | 0.05 | 0.160 | 880 | 16 | 0.94 | 49 | 3.8 | — | — | 1.25 ± 0.10 |
| 64 | 0.033 | 0.05 | 0.163 | 880 | 16 | 1.7 | 44 | 4.9 | 1.73 | 122 ± 4 | — |
| 65 | 0.039 | None | 0.08 | 900 | 20 | 7.2 | 35 | 3.7 | 1.29 | 74 ± 2 | — |
| 66 | 0.039 | None | 0.05 | 910 | 13 | 1.4 | 37 | 2.8 | 1.99 | — | 1.18 ± 0.02 |
| 67 | 0.039 | 0.10 | 0.192 | 270 | 32 | 7.0 | 45 | 10.5 | 1.33 | 31 ± 3 | — |
| 68 | 0.039 | 0.10 | 0.192 | 270 | 19 | 0.90 | 51 | 6.8 | 1.97 | 70 ± 6 | 0.78 ± 0.06 |
| 69 | 0.056 | 0.10 | 0.28 | 250 | 30 | 1.0 | 60 | 7.9 | 2.08 | 39 ± 12 | 0.29 ± 0.03 |
| 70 | 0.056 | 0.10 | 0.22 | 200 | 40 | 1.4 | 65 | 10.6 | 2.06 | 56 ± 11 | 0.16 ± 0.01 |
| 71 | 0.056 | None | 0.62 | 150 | 50 | 0.70 | 61 | 8.7 | — | 56 ± 21 | — |
| 72 | 0.056 | 0.20 | 0.62 | 150 | 40 | 1.0 | .65 | 9.0 | — | 34 ± 15 | 0.28 ± 0.11 |
| 73 | 0.056 | 0.20 | 0.63 | 150 | 50 | 6.1 | 53 | 14.3 | 1.59 | 10 ± 10 | — |
| 74 | 0.056 | 0.20 | 2.48 | 150 | 50 | 1.7 | 57 | 10.9 | 2.01 | 37 ± 11 | — |

The data shown in Table IV illustrates that polymers having a relatively broad molecular weight distribution can be made with the catalyst systems of the present invention if the support used in such catalyst systems has been activated at a relatively low temperature. The data indicates that the lower is the activation temperature of the support used in the catalyst system, the broader is the molecular weight distribution of the polymers made therewith. This conclusion is based on the facts that for polymers having equivalent melt index properties, but made with catalysts containing supports which have been activated at different temperatures, the tensile impact strengths and Izod strengths of such polymers decline, while the % of cyclohexane extractables and the intrinsic viscosity values of such polymers increase, as the support activation temperature is decreased.

EXAMPLES 75-78

Examples 75-78 are provided to demonstrate the effect, on polymer product yield, of varying the ratio of the strong reducing agent to organochromium compound in the catalysts of the present invention. The supported catalysts used in the Examples 75-78 were prepared with the same support used in Examples 1-29 and using butyl silane as the silane modified and triethyl aluminum (TEA) as the strong reducing agent. The supports used in Examples 75-78 were activated at 270°C. Table V also lists the amounts of organochromium compound, strong reducing agent and silane used in preparing the various catalysts that were evaluated in Examples 75-78, as well as the yields of polymer that were obtained with such catalysts.

TABLE V

EFFECT ON YIELD OF VARIATIONS IN STRONG REDUCING AGENT/ORGANOCHROMIUM COMPOUND RATIO

| EXAMPLE | BCPC MMOLES | TEA MMOLES | SILANE MMOLES | YIELD GR./HOUR |
|---|---|---|---|---|
| 75 | 0.039 | 0.10 | 0.192 | 292 |
| 76 | 0.039 | 0.20 | 0.192 | 286 |
| 77 | 0.039 | 0.40 | 0.192 | 158 |
| 78 | 0.039 | 0.60 | 0.192 | 0 |

The data shown in Table V illustrates that the use of ratios of strong reducing agent to organochromium compound in excess of about 5:1 in the catalysts of the present invention, leads to a decrease in yield of polymer product, and that when such ratio exceeds about 10:1 the strong reducing agent appears to act as a catalyst poison.

When the polymers made in Examples 1-78 were prepared with the catalysts of the present invention they were essentially saturated materials, i.e., when subjected to infrared spectrum analysis IR spectra shows an essential absence of absorption bands in the 10-13.25μ IR absorption region.

What is claimed is:

1. In a process for polymerizing a monomer charge comprising at least one alpha olefin by contacting it with a catalyst comprising at least one bis(cyclopentadienyl)chromium[II] compound having the structure wherein R' and R" are the same or different $C_1$ to $C_{20}$, inclusive, hydrocarbon radicals and $n'$ and $n''$ are the same or different integers of 0 to 5, inclusive, and 0.1 to 50 moles, per mole of said bis(cyclopentadienyl)chromium[II] compound, of at least one silane compound selected from the group consisting of compounds having the structures wherein $m$ is an integer from 0 to 3 inclusive, $n$ is an integer from 0 to 3 inclusive, and R is a hydrocarbon group containing from 1 to about 10 carbon atoms, supported on activated inorganic oxide support which has a surface area of about 50 to 1000 square meters per gram and has been activated at a temperature of about 150° to 1000°C. and is selected from the group consisting of silica, alumina, thoria, zirconia and mixtures thereof, the improvement which comprises adding to said catalyst, prior to said contact, about 0.001 to 10 moles of at least one strong reducing agent per mole of said bis(cyclopentadienyl)chromium[II] compound, said strong reducing agent being other than said bis(cyclopentadienyl)chromium[II] compound and being devoid of halogen atoms.

2. A process as in claim 1 in which said silane compound has the structure $R_{4-n}SiH_n$.

3. A process as in claim 2 in which said monomer charge comprises ethylene.

4. A process as in claim 3 in which ethylene is homopolymerized.

5. A process as in claim 4 in which said strong reducing agent is an organometallic compound.

6. A process as in claim 5 in which said strong reducing agent has the structure $$R''_y AlH_z$$

wherein R'' is a $C_1$ to $C_{14}$ alkyl group, y is an integer from 1 to 3, inclusive, z is an integer from 0 to 2, inclusive, and the sum of y and z is 3.

7. A process as in claim 6 in which z is 0 or 1.

8. A process as in claim 7 in which the aluminum alkyl compound is an aluminum trialkyl compound.

9. A process as in claim 8 in which said aluminum trialkyl compound is triethyl aluminum.

10. A process as in claim 5 in which said strong reducing agent has the structure.

$$R'''_x Al(OR''')_w$$

wherein R''' is a $C_1$ to $C_{14}$ hydrocarbyl group, and x and w are each integers from 1 to 2, inclusive, and the sum of x and w is 3.

11. A process as in claim 10 in which said strong reducing agent is an aluminum ethoxide compound.

12. A process as in claim 11 in which said strong reducing agent is diethyl aluminum ethoxide.

13. A process as in claim 5 in which said strong reducing agent has the structure Me'R'', $(Me\frac{1}{a})Me(R'')_b$ or $(R''_a Me-Me-(R'')_c$ wherein R'' is a monovalent $C_1$ to $C_{14}$ hydrocarbon group, Me is a polyvalent, and Me' is a monovalent metal or metalloid selected from the group consisting of B, Zn, Mg, Li, Na, K, Ca, Ga, In, Cd, Sc, Y, La, Ge, Ns, Sb, and Bi, a is 0 or 1, b is an integer such that a+b equals the valence of Me, and c is an integer which is 1 less than the valence of Me.

14. A process as in claim 13 in which said strong reducing agent has the structure Me'R'' or $(Me\frac{1}{a})Me-(R'')_b$ 15. A process as in claim 14 in which Me' is Li.

16. A process as in claim 15 in which the strong reducing agent is butyl lithium.

17. A process as in claim 14 in which Me is Mg.

18. A process as in claim 17 in which the strong reducing agent is diethyl magnesium.

19. A process as in claim 1 which is conducted in an inert solvent medium.

20. A process as in claim 19 which is conducted under slurry polymerization conditions.

21. A process as in claim 1 in which n' and n'' are 0.

22. A process as in claim 21 in which the inorganic oxide comprises silica.

23. A process as in claim 22 in which the inorganic oxide comprises silica-alumina.

24. A process as in claim 23 in which said monomer charge comprises ethylene.

25. A process as in claim 23 in which ethylene is homopolymerized.

26. A process as in claim 21 in which said strong reducing agent is selected from the group consisting of
a. metals of Groups IA and IIA of the Mendeleef Periodic table which have an atomic weight of <200,
b. inorganic or organic compounds of said a) metals, and
c. inorganic or organic compounds of boron, bismuth and metals of Groups IIB, IIIA, IIIB, IVA and VA of said Periodic table which have an atomic weight of <200.

27. A process as in claim 26 in which said strong reducing agent is an aluminum alkyl compound.

28. A process as in claim 27 in which said aluminum alkyl compound is triethyl aluminum.

29. A process as in claim 26 in which said strong reducing agent is an aluminum alkoxide compound.

30. A process as in claim 29 in which said aluminum alkoxide compound is diethyl aluminum ethoxide.

31. A process as in claim 26 in which said strong reducing agent is a lithium alkyl compound.

32. A process as in claim 31 in which said lithium alkyl compound is butyl lithium.

33. A process as in claim 26 in which said strong reducing agent is a magnesium alkyl compound.

34. A process as in claim 33 in which said magnesium alkyl compound is diethyl magnesium.

35. An olefin polymerization catalyst which comprises at least one bis(cyclopentadienyl)chromium[II] compound having the structure wherein R' and R'' are the same or different $C_1$ to $C_{20}$, inclusive, hydrocarbon radicals, and n' and n'' are the same or different integers of 0 to 5, inclusive, and 0.1 to 50 moles, per mole of said bis(cyclopentadienyl)chromium[II] compound of at least one silane compound selected from the group consisting of compounds having the structures $H_3Si-[SiH_2]_m-H$ and $R_{4-n}SiH_n$ wherein m is an integer from 0 to 3 inclusive, n is an integer from 0 to 3 inclusive, and R is a hydrocarbon group containing from 1 to about 10 carbon atoms, supported on activated inorganic oxide support which has a surface area of about 50 to 1,000 square meters per gram and has been activated at a temperature of about 150° to 1,000°C. and is selected from the group consisting of silica, alumina, thoria and zirconia, and mixtures thereof, and treated with about 0.001 to 10 moles of strong reducing agent per mol of said bis(cyclopentadienyl)chromium[II] compound, said strong reducing agent being other than said bis(cyclopentadienyl)chromium[II] compound and being devoid of halogen atoms.

36. A catalyst as in claim 35 in which said strong reducing agent contains one or more organic radicals.

37. A catalyst as in claim 36 in which said strong reducing agent has the structure $$R''_y AlH_z$$

wherein $R''$ is a $C_1$ to $C_{14}$ alkyl group, $y$ is an integer from 1 to 3, inclusive, $z$ is an integer from 0 to 2, inclusive, and the sum of $y$ and $z$ is 3.

38. A catalyst as in claim 37 in which $z$ is 0 or 1.

39. A catalyst as in claim 38 in which the aluminum alkyl compound is an aluminum trialkyl compound.

40. A catalyst as in claim 39 in which said aluminum trialkyl compound is triethyl aluminum.

41. A catalyst as in claim 36 in which said strong reducing agent has the structure $$R'''_x Al(OR''')_w$$

wherein $R'''$ is a $C_1$ to $C_{14}$ hydrocarbyl group, and $x$ and $w$ are each integers from 1 to 2, inclusive, and the sum of $x$ and $w$ is 3.

42. A catalyst as in claim 41 in which said strong reducing agent is an aluminum ethoxide compound.

43. A catalyst as in claim 42 in which said aluminum ethoxide compound is diethyl aluminum ethoxide.

44. A catalyst as in claim 36 in which said strong reducing agent has the structure $$Me'R'', \ (Me')_a Me(R'')_b \text{ or } (R'')_c Me\text{-}Me(R'')_c$$

wherein $R''$ is a monovalent $C_1$ to $C_{14}$ hydrocarbon group, Me is a polyvalent, and Me' is a monovalent, metal or metalloid selected from the group consisting of B, Zn, Mg, Li, Na, K, Ca, Ga, In, Cd, Sc, Y, La, Ge, Sn, Sb and Bi, $a$ is 0 or 1, $b$ is an integer such that $a+b$ equals the valence of Me, and $c$ is an integer which is one less than the valence of Me.

45. A catalyst as in claim 44 in which said strong reducing agent has the structure $$Me'R'' \text{ or } (Me')_a Me(R'')_b$$

46. A catalyst as in claim 45 in which Me' is Li.

47. A catalyst as in claim 46 in which said strong reducing agent is butyl lithium.

48. A catalyst as in claim 45 in which Me is Mg.

49. A catalyst as in claim 48 in which said strong reducing agent is diethyl magnesium.

* * * * *

PO-1050
(5/69)

UNITED STATES PATENT OFFICE
CERTIFICATE OF CORRECTION

Patent No. 3,879,368　　　　　　Dated April 22, 1975

Inventor(s) Robert N. Johnson

It is certified that error appears in the above-identified patent and that said Letters Patent are hereby corrected as shown below:

Column 2, line 40, "are" should be inserted after --which--.

Column 20, line 26, "patent applications" should read --patents--.

Column 21, line 44, "modified" should read --modifier--.

Column 23, line 42, "," should be inserted after --monovalent--.

Column 23, line 45, "Ns" should read --Sn--.

Signed and Sealed this sixteenth Day of September 1975

[SEAL]

Attest:

RUTH C. MASON
Attesting Officer

C. MARSHALL DANN
Commissioner of Patents and Trademarks